з,293,088
METHOD FOR PRODUCING ADHERENT COATINGS ON CLEAN METAL PARTS
Willy Herbst, Hofheim, Taunus, Germany, Fritz Walter Artur Rochlitz, deceased, late of Bad Soden, Taunus, Germany, by Franz Rochlitz, heir, and Anneliese Rochlitz, heiress, both of Stuttgart-Degerloch, Germany, and Herbert Vilcsek, Hofheim, Taunus, and Ernst Wagner, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 28, 1963, Ser. No. 319,599
Claims priority, application Germany, Nov. 18, 1959, F 29,875
5 Claims. (Cl. 148—6.15)

The present application is a continuation in part of copending application Serial No. 69,301 filed November 15, 1960, now abandoned.

This invention relates to a method for producing adherent uniform coatings clean on metals, particularly for preventing corrosion and providing adherence of lacquers and varnishes. The invention particularly concerns the coating of clean metals by contacting them with a solution of macromolecular substances of vinyl phosphonic acid, $(CH_2=CHPO(OH)_2$, and subsequently drying the metals thus treated.

It is desired in German printed application No. 1,049,191 laid open to public inspection to produce boundary layers of organic substances on metals by applying free phosphonic acids or their derivatives containing a vinyl group to metals, particularly iron, and converting them into phosphonic acids of higher molecular weight by copolymerization with polymerizable unsaturated compounds.

According to the aforesaid process, the metal surface is immersed in a first step in a heated aqueous solution of monomeric allyl phosphonic acid, whereby the thickness of the layer of ferrous allylphosphonate formed can be varied by the temperature of the solution and the time for which the metal is immersed in the solution. The layers so obtained have subsequently to be rinsed with water and dried. In a second step, a lacquer or varnish consisting, for example, of unsaturated polyesters and styrene is applied in known manner and hardened by copolymerization.

The layers made by this known process are, however, not always satisfactory. For example, the allyl phosphonic acid solution may be rapidly exhausted in certain circumstances so that irregular top coatings which can be wiped off and are unsuitable for a subsequent copolymerization are obtained and undesired sludge formation occurs.

The present invention provides a process which enables the disadvantages of the aforesaid prior art process to be avoided. According to the invention, clean metal parts are contacted with a solution of macromolecular substances of vinyl phosphonic acid and are subsequently dried. By "macromolecular substances of vinyl phosphonic acid" as used herein in describing the present invention are meant high molecular weight homopolymers of vinyl phosphonic acid and/or copolymers of vinyl phosphonic acid with 1 or more comonomeric materials and/or copolymers containing acid derivatives of vinyl phosphonic acid which have, per monomer unit, only one free hydroxyl group at the phosphorus atom. Such derivatives include, for example, the monoesters of vinyl phosphonic acid with alkanols having 1 to 8 carbon atoms.

A process for the preparation of free vinyl phosphonic acid by hydrolysis of vinyl phosphonic acid dichloride, in turn prepared from vinyl phosphonic acid esters reacted with phosphorus pentachloride, is described in commonly owned copending application Serial No. 645,028 filed March 11, 1957, now U.S. Patent 3,098,865 granted July 23, 1963. The preparation of homopolymers of vinyl phosphonic acid in the presence of suitable catalysts, the application of heat, or by ultraviolet light is disclosed in commonly owned copending application Serial No. 67,915 filed November 8, 1960, now abandoned and refiled on October 22, 1964, as Serial No. 405,870.

The preparation of copolymers of vinyl phosphonic acid or vinyl phosphonic acid salts with numerous olefinically unsaturated comonomers is disclosed in commonly owned copending application Serial No. 80,532 filed January 4, 1961, and now abandoned. The preparation of vinyl phosphonic acid semiesters, their homopolymerization, and their copolymerization are disclosed in commonly owned copending application Serial No. 89,342 filed February 15, 1961, and now abandoned.

As suitable comonomeric components for copolymers of vinyl phosphonic acid and/or copolymers of vinyl phosphonic acid derivatives having only 1 free hydroxyl group at the phosphorus atom of each monomer unit (e.g. vinyl phosphonic acid semiesters), there may be used organic compounds containing one or more olefinic bonds having a substantially polar character. Materials of this type include vinyl and vinylidene compounds such as acrylic acid, methacrylic acid, acrylates and methacrylates of lower alkanols having 1–4 carbon atoms, acrylamide, acrylonitrile, methacrylamide, methacrylonitrile, vinyl esters such as vinyl acetate and vinyl propionate, and maleic anhydride and crotonic acid.

There may also be used copolymers of vinyl phosphonic acid that are built up from at least three components, for example from vinyl phosphonic acid, acrylic acid and maleic anhydride or crotonic acid.

It has been found that even a polymer content of at least about 0.01% by weight of the treating solution, produces a good effect in the present invention. Advantageously, a solution containing about 0.01 to about 7% by weight of polymer is used if it is intended to subsequently apply a lacquer or varnish, while a solution containing about 0.01 to about 15% by weight of polymer is advantageous if no lacquer or varnish is subsequently applied.

It is surprising that the polymers indicated in the foregoing, in spite of their very good solubility in water and several organic solvents or mixtures of solvents, form noncrystalline to crystalline dense coatings of excellent corrosion preventing properties on metal surfaces which have been cleaned in known manner or pickled.

As solvents for polyvinyl phosphonic acid and the copolymers mentioned in the foregoing, water or aliphatic alcohols containing 1 to 4 carbon atoms in the molecule, preferably isopropanol, may be used. Especially advantageous are mixtures of water and the said aliphatic alcohols, for example, those in which the ratio of water to alcohol is within the range of 2:8 to 8:2 parts by volume.

Alternatively, organic solvents may be used in which the polymers dissolve only after addition of a solution promoter. As such solution promoter an alcohol, preferably isopropanol, or water may be used. Well adhering protective coatings are obtained, for example, from solvent mixtures of isopropanol with benzene or acetone.

It is also very advantageous to use a solution which contains from about 0.01 to about 1 percent by weight of at least one wetting agent in addition to the polymer. As such wetting agents, commercially available products are suitably used when water or mixtures of water and organic solvents in which the predominant part is water are used as solvent. Among the suitable commercially available non-ionogenic wetting agents are polyethylene glycol ethers of the formula $$RO(CH_2CH_2O)_nH$$

where R is an alkyl, aryl, or alkaryl group, and $n$ is an integer between 3 and 30. Particularly good materials of this type are polyglycol ethers of nonylphenol of the formula $$C_9H_{19} \cdot C_6H_4O \cdot (CH_2CH_2O)_nH$$

Other suitable wetting agents include the commercially available ethoxylated amines of fatty acids such as the ethoxylated amines of coconut oil fatty acids or of oleic acid.

When carrying out the process of the invention in practice, it is of advantage to treat the clean metal surfaces for a short time, advantageously less than three minutes, with a solution containing one or more of the above mentioned polymers, and subsequently to dry the metals thus treated. The solution may be applied to the clean metal parts in known manner, for example by spraying, immersion or application with a brush or rag. Application with a rag means wiping the metal surface with a rag moistened with the solution while taking care that the solution covers the metal surface uniformly. The metal parts are subsequently dried at about 80° to about 200° C., the temperature depending in the first place on the nature of the solvent or mixture of solvents used. After drying, a thin dense coating is obtained which adheres well to the metal surfaces. Depending on the content of polymer in the solution and the nature of the solvent used, film-like to crystalline coatings are obtained in that manner. When solutions containing 0.01 to 1% by weight of polymer are used, the coatings obtained on the metal surfaces are so thin that they can be recognized only as tempering colors.

Owing to the short period of time for which the metals are treated and which should be less than about 2 to 3 minutes, no appreciable amounts of metal ions penetrate into the solution by attack from the solution so that the solution does not tire. This is a considerable advantage of the present invention since the waste water problems arising in the known corrosion prevention processes are thus avoided. The chemical reaction between metal surface and polyvinyl phosphonic acid and/or the copolymers indicated in the foregoing, which reaction leads to the formation of the adhering coatings of the invention, occurs substantially only during drying.

The concentration of polyvinyl phosphonic acid and/or the indicated acid copolymers in the solution decreases with the continuous consumption of these substances and can be easily determined by titration of the acid groups, if desired by determination of the pH value. The bath can be re-adjusted to the original concentration in a simple manner by adding a concentrate of the polymer used or of the corresponding substances in a solid form.

In practice, it is often the case that rolled plates, after being pretreated, are freed in the rolling mill from mill scale by pickling, for example, with hydrochloric acid, neutralized, for example with lime, and then stored for some time until they are further treated, during which storage they are exposed to the hydrochloric acid vapors of the pickling baths, or they are forwarded to another rolling mill for further treatment and exposed to atmospheric factors on transport. Because exposure to all these factors, on storage or transport, lasts only some weeks at most, a costly surface treatment of the rolled plates, for example a phosphate or chromate treatment, is dispensed with, in case of a chromate treatment also because of the necessary treatment of the waste water, so that the pickled plates become rusty and have to be pickled again before being further treated. Rolling mills carrying out the further treatment therefore need own pickling plants and have to deal with all the sewage problems involved therein.

It has been found that also in this case the process of the invention can be used with advantage to obtain appropriate corrosion protection. The coatings produced in accordance with the invention, for example, on steel plates, are very resistant to hydrochloric acid vapors and prevent corrosive attack from these vapors. For example, steel plates which had been degreased in known manner and parts of which had been treated by the process of the invention while other parts were not treated were suspended in a hood in which hydrochloric acid was evaporated for several hours a day. Whereas in the case of the untreated plates rusting set in already after a few hours and proceeded rapidly, the test samples treated by the process of the invention showed the first traces of rust, substantially at the edges, after four weeks at the earliest. The tests furthermore showed that this good corrosion protection is also obtained on plates which have been pickled with acids, for example hydrochloric acid, subsequently rinsed with water or treated with a neutralizing agent such as lime, soda, alkalies or commercially available cleansing agents which have been rendered alkaline, and then coated in accordance with the invention.

It has also been found that the protective coatings produced on metal surfaces by the process of the invention permit a good adhesion of lacquers and varnishes. The said adhesion increases, for example, for an alkyd resin baking varnish requiring a baking temperature of 145° C. and a period of baking of about 30 minutes, with decreasing content of polymer in the solution, i.e. with decreasing thickness of layer. To obtain good lacquer or varnish adhesion, the polymer concentration in the solution should advantageously be within the range of about 0.01 to 7% by weight, preferably 0.1 to 5% by weight.

For treating clean metal parts which are to be protected against corrosion without subsequent application of a lacquer or varnish, solutions containing about 0.1 to about 15% by weight, preferably 1 to 8% by weight, of polymer are especially advantageous.

The process of the invention enables not only iron and iron alloys, particularly steels, to be provided with a well adhering dense coating, especially for corrosion protection and/or for providing adherence of lacquers and varnishes, but also other metals, for example aluminum, zinc, magnesium, copper, chromium, nickel and their alloys.

While in a great many of the known processes for preventing corrosion that are used in industry, utmost care has to be taken that the water used for the bath has a low chloride content; a chloride content of up to 500 mg./liter in the solutions of the invention has no detrimental effect on the degree of corrosion protection obtained so that water which has not been freed from salt may be used for the batch.

The following examples serve to illustrate the invention but they are not intended to limit it thereto:

EXAMPLE 1

Steel plates for motor car bodies were degreased by boiling for 10 minutes with a commercially available degreasing agent which had been rendered alkaline and contained emulsifiers and silicates, and subsequently rinsed with cold water. The steel plates were then immersed for 1 minute in a solution of polyvinyl phosphonic acid and after the solution had dripped off they were dried for about 5 minutes at about 150° C. in a drying closet.

The polymer solution had the following composition:

565 cc. of water
435 cc. of isopropanol
60 grams of an isopropanol solution containing 35% by weight of polyvinyl phosphonic acid.

On drying, a uniform well adhering gray coating formed on the steel plates. An alkyd resin baking varnish was then applied in two stages (primer and enamel) at a baking temperature of 145° C., the baking time amounting to 25 minutes. The plates thus treated were subjected to the usual corrosion and lacquer and varnish adhesion tests. The following results were obtained:

(a) Lacquer and varnish adhesion tests according to Erichsen, DIN specification No. 53,156, yielded the same values of 10.0 mm. (maximum value of test scale) for plates which had been treated by the process of the invention as, for example, for samples treated with heavy metal phosphate.

(b) Salt water test: The plates provided with lacquer or varnish were diagonally scratched down to the metallic ground with a needle and immersed for 72 hours at 20° C. in a 3% common salt solution.

| | Mark |
|---|---|
| (1) Test samples treated by the process of the invention | 5.5 to 6.0 |
| (2) Test samples treated at 70° C. with a commercially available zinc phosphatizing solution and subsequently provided with the same test varnish | 5.5 to 6.0 |
| (3) Test samples passivated with inhibited phophoric acid and provided with the same test varnish | 3.0 to 4.0 |
| (4) Comparison samples degreased and provided with a varnish in the same manner but not subjected to a further treatment | 1.0 |

NOTE.—Mark 1=no corrosion protection (varnish chips off completely). Mark 3=varnish chips off over a width of 0.5 cm. on either side of the scratch. Mark 4=varnish chips off over a width of 0.25 cm. on either side of the scratch. Mark 5=varnish chips off over a width of 0.1 cm. Mark 6=very good corrosion protection (varnish does not chip off at the scratch).

Table 1 given below indicates the test results and test conditions of a further 22 tests carried out in the same manner and in which the polymer used, its composition and concentration, the solvent, time of treatment, temperature of the bath, time of drying and temperature of drying were varied within certain limits.

In test 1 of the foregoing Table I, the solution additionally contained 0.02 gm./liter of $$C_9H_{19} \cdot C_6H_4O \cdot (CH_2CH_2O)_{11}H$$

as a wetting agent. In test 2, 0.06 gm./liter of $$C_9H_{19} \cdot C_6H_4O \cdot (CH_2CH_1O)_8H$$

were present as a wetting agent. In test 5, the solution contained 1 percent by weight of $$C_9H_{19} \cdot C_6H_4O \cdot (CH_2CH_2O)_{10}H$$

and about 0.1 percent of $C_9H_{19} \cdot C_6H_4O \cdot (CH_2CH_2O)_{13}H$ was used as a wetting agent in the solution of test 9. In test 21, 0.5 percent of an ethoxylated amine of coconut oil, having an average of 10 molecules of ethylene oxide added, was present as a wetting agent. In test 22, a similar material having an average of 7 molecules of ethylene oxide added on an amine of coconut oil was employed in an amount of 0.3 percent by weight as a wetting agent.

EXAMPLE 2

Steel plates for motorcar bodies were treated for 10 minutes with a hot commercially available degreasing agent which had been rendered alkaline and contained emulsifiers and silicates, rinsed with cold water, immersed for 10 seconds in an aqueous 0.6% solution of a vinyl phosphonic acid/acrylic acid copolymer (molar ratio 1:0.83) and, after the solution had dripped off, dried for 5 minutes at about 150° C. in a drying closet. On drying, a uniform adhering coating showing a play of reddish colors formed on the plates. The latter were then coated with an alkyd resin baking varnish in 2 stages (primer and enamel) at a baking temperature of 145° C., the baking time amounting to 25 minutes. In the usual corrosion and lacquer and varnish adhesion tests, the plates thus treated yielded excellent results which corre-

TABLE I

| Test No. | Polymer Component A | Component B | Component C | Proportion by weight A:B:C | Concentration in g/l. | Solvent Comp A | Comp B | Proportion by weight A:B | Time of treatment with polymer solution in sec. | Bath temperature in °C. | Time of drying in min. | Drying temperature in °C. | Salt water test mark |
|---|---|---|---|---|---|---|---|---|---|---|---|---|---|
| 1 | Polyvinylphosphonic acid | | | | 0.4 | Water | | | 180 | 25 | 7 | 180 | 4.5–5.0 |
| 2 | ...do... | | | | 1 | ...do... | | | 2 | 50 | 10 | 160 | 5.0 |
| 3 | ...do... | | | | 15 | ...do... | | | 3 | 20 | 6 | 140 | 5.0 |
| 4 | ...do... | | | | 20 | Water | | | 1.5 | 16 | 8 | 90 | 5.0 |
| 5 | ...do... | | | | 30 | ...do... | Isopropanol | 7:3 | 15 | 18 | 10 | 150 | 6.0 |
| 6 | ...do... | | | | 30 | ...do... | Isopropanol (commercial) | | 1 | 18 | 10 | 110 | 6.0 |
| 7 | ...do... | | | | 30 | ...do... | Isopropanol | | 1 | 18 | 7 | 125 | 6.5 |
| 8 | ...do... | | | | 50 | ...do... | Ethanol | | 15 | 21 | 16 | 135 | 6.0 |
| 9 | Vinylphosphonic acid | Acrylic acid | | 80:20 | 8 | ...do... | Isobutanol | 3:7 | 1 | 15 | 9 | 120 | 6.5 |
| 10 | ...do... | ...do... | | 50:50 | 20 | ...do... | | 8:2 | 15 | 19 | 10 | 140 | 5.5 |
| 11 | ...do... | ...do... | | 20:80 | 30 | ...do... | Propanol | 8:2 | 2 | 20 | 10 | 130 | 5.5 |
| 12 | ...do... | Methacrylic acid | | 60:40 | 30 | ...do... | Isopropanol | 9:1 | 4 | 20 | 10 | 130 | 6.0 |
| 13 | Vinylphosphonic acid | Acrylic acid | | 30:70 | 7 | ...do... | ...do... | 1:1 | 1 | 18 | 10 | 145 | 5.5 |
| 14 | Vinylphosphonic acid | Acrylic acid ethyl ester | | 60:40 | 15 | ...do... | | 4:6 | 1.5 | 18 | 8 | 140 | 5.5 |
| 15 | ...do... | Vinyl acetate | | 80:20 | 12 | ...do... | | | 3 | 19 | 10 | 150 | 6.0 |
| 16 | ...do... | ...do... | | 30:70 | 10 | ...do... | Ethanol | 9:1 | 2 | 21 | 10 | 145 | 5.5 |
| 17 | Vinyl phosphonic acid | Acrylic acid monoethyl ester | | 60:40 | 6 | ...do... | | | 1.5 | 20 | 10 | 150 | 5.5 |
| 18 | Vinyl phosphonic acid | Vinylphosphonic acid monoethyl ester | | 70:30 | 10 | ...do... | | | 2 | 18 | 8 | 145 | 5.5 |
| 19 | Vinylphosphonic acid | Acrylonitrile | | 75:25 | 8 | ...do... | Isopropanol | 8:2 | 2 | 19 | 10 | 140 | 5.5 |
| 20 | ...do... | Acrylic acid | | 40:60 | 8 | ...do... | | | 3 | 21 | 10 | 150 | 6.0 |
| 21 | Vinylphosphonic acid | Vinylacetate | Acrylic acid | 60:20:20 | 27 | ...do... | | | 2 | 20 | 10 | 140 | 6.0 |
| 22 | Polyphosphonic acid | | | | 15 | ...do... | | | 10 | 18 | 10 | 120 | 6.0 | sponded to those obtained with a good phosphate layer which had been subsequently passivated.

EXAMPLE 3

Degreased steel plates were pickled for 8 minutes with commercially available inhibited hydrochloric acid and rinsed with cold water. The solution of a copolymer of vinyl phosphonic acid and methacrylic acid (molar ratio 0.6:1) was then uniformly applied to the surfaces of the plates with a rag moistened with that solution. The solution had the following composition:

635 cc. of water
365 cc. of isopropanol
12.5 grams of the named copolymer.

After drying for 10 minutes at 115° C. in a drying closet, the plates showed a play of tempering colors. They were coated with a baking varnish as described in Example 1 and subjected to various conventional corrosion and lacquer and varnish adhesion tests. The lacquer and varnish adhesion was particularly good, and the corrosion protection was excellent.

EXAMPLE 4

Strongly scaled rolled plates for motorcar bodies were pickled for 20 minutes with commercially available inhibited hydrochloric acid, rinsed with cold water and immersed for 15 seconds in an aqueous 7% solution of a copolymer of vinyl phosphonic acid ethyl ester and vinyl acetate (molar ratio 3:1.07). After drying for 5 minutes at 135° C. the plates were subjected to open-air weathering. While pickled plates which had not been coated were already rusty after a few hours, the test samples treated according to the invention showed no rust formation within 4 weeks.

Table 2 given above indicates the test results and test conditions of a further 7 tests which were carried out in the manner described in Example 4 and in which the content and composition of the solutions, the time of treatment, the solvent, etc. were varied. None of the samples of Table 2 showed any rust formation within 4 weeks.

Results equivalent to those obtained in Examples 1 to 4 were obtained in test samples of pure aluminum, aluminum containing 3% of magnesium, an Al-Mg-Si alloy and of brass. With the use of water as solvent and an addition of commercially available wetting agents, similar test results were also obtained.

What is claimed is:
1. A method for producing adherent uniform coatings on clean metals, particularly for preventing corrosion and providing adherence of lacquers and varnishes, which comprises the steps of contacting said clean metals with a solution of macromolecular substances of vinyl phosphonic acid in a solvent selected from the group consisting of water and aliphatic alcohols having 1 to 4 carbon atoms, and subsequently drying the metals thus treated at a temperature ranging from about 80° C. to about 200° C.

2. A method as in claim 1 wherein said solution contains at least 0.01% by weight of homopolymers of vinyl phosphonic acid.

3. A method as in claim 1 wherein said solution additionally contains a non-ionogenic wetting agent selected from the group consisting of polyethylene glycol ethers and ethoxylated amines of fatty acids.

4. A method as in claim 1 wherein said solution contains at least 0.01% by weight of a copolymer of vinyl phosphonic acid and a member selected from the group consisting of acrylic and methacrylic acids, nitriles and halogen-free esters and amides of these acids, halogen-free vinyl esters, maleic anhydride, and crotonic acid.

5. A method as in claim 1 wherein said solution contains at least 0.01% by weight of a copolymer of a monoester of vinyl phosphonic acid and a member selected from the group consisting of acrylic and methacrylic acids, nitriles and halogen-free esters and amides of these acids, halogen-free vinyl esters, maleic anhydride, and crotonic acid.

TABLE II

| Test No. | Polymer | | Proportion by weight A:B | Cncentration in g./l. | Solvent or solvent mixture | | | Proportion by volume A:B:C | Time of treatment with polymer solution in sec. | Temperature of bath in ° C. | Time of drying in minutes | Drying temperature in ° C. |
|---|---|---|---|---|---|---|---|---|---|---|---|---|
| | Component A | Component B | | | Comp. A | Comp. B | Comp. C | | | | | |
| 1 | Polyvinyl phosphonic acid. | | | 100 | Isopropanol (commercial). | | | | 5 | 20 | 5 | 90 |
| 2 | ___do___ | | | 60 | ___do___ | Water | | 70:30 | 3 | 20 | 10 | 130 |
| 3 | ___do___ | | | 20 | ___do___ | ___do___ | | 30:70 | 2 | 18 | 8 | 145 |
| 4 | Vinyl phosphonic acid. | Acrylic acid. | 80:20 | 50 | Ethanol | ___do___ | | 50:50 | 2 | 19 | 7 | 140 |
| 5 | ___do___ | ___do___ | 50:50 | 60 | Isopropanol. | Acetone | Water | 60:30:10 | 2 | 18 | 7 | 120 |
| 6 | Vinyl phosphonic acid monoethyl ester. | Vinyl acetate | 50:50 | 40 | Water | | | | 10 | 17 | 10 | 150 |
| 7 | Polyvinyl phosphonic acid monoethyl ester. | | | 40 | ___do___ | | | | 60 | 18 | 10 | 150 |

References Cited by the Examiner

UNITED STATES PATENTS

Re. 24,875  9/1960  McDonald _____ 148—6.15
2,439,214  4/1948  Lindsey _____ 260—80 X
3,196,039  7/1965  Herbst et al. _____ 148—6.15 X
3,200,004  8/1965  Herbst et al. _____ 148—6.15 X
3,202,534  8/1965  Duch et al. _____ 148—6.15 X
3,224,908  12/1965  Duch et al. _____ 148—6.15

FOREIGN PATENTS 1,174,045  3/1959  France.

ALFRED L. LEAVITT, *Primary Examiner.*

MURRAY KATZ, *Examiner.*

J. R. BATTEN, JR., *Assistant Examiner.*